(12) United States Patent
Kerber et al.

(10) Patent No.: US 8,444,152 B2
(45) Date of Patent: May 21, 2013

(54) SPRING SEAL ASSEMBLY AND METHOD OF SEALING A GAP

(75) Inventors: Onika Misasha Kerber, Gray Court, SC (US); David Richard Johns, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 76 days.

(21) Appl. No.: 13/100,554

(22) Filed: May 4, 2011

(65) Prior Publication Data
US 2012/0280455 A1 Nov. 8, 2012

(51) Int. Cl.
*F16J 15/02* (2006.01)

(52) U.S. Cl.
USPC ............................ 277/312; 277/643; 277/644

(58) Field of Classification Search
USPC ................. 277/630, 637, 641, 642, 643, 644, 277/312
See application file for complete search history.

(56) References Cited

U.S. PATENT DOCUMENTS

| | | | | |
|---|---|---|---|---|
| 3,975,114 A * | 8/1976 | Kalkbrenner | ............... | 415/210.1 |
| 4,155,561 A * | 5/1979 | Rudy et al. | ............... | 277/641 |
| 4,448,000 A * | 5/1984 | Manuccia et al. | ............... | 52/208 |
| 4,549,740 A * | 10/1985 | Nutter | ............... | 277/637 |
| 5,211,407 A * | 5/1993 | Glynn et al. | ............... | 277/632 |
| 5,820,133 A * | 10/1998 | Altshuler | ............... | 277/630 |
| 5,865,600 A * | 2/1999 | Mori et al. | ............... | 416/198 A |
| 5,904,357 A * | 5/1999 | Demirdogen et al. | ............... | 277/630 |
| 6,024,364 A * | 2/2000 | Steffen | ............... | 277/645 |
| 6,086,329 A * | 7/2000 | Tomita et al. | ............... | 416/193 A |
| 6,193,240 B1 * | 2/2001 | Johnson et al. | ............... | 277/643 |
| 6,916,024 B2 * | 7/2005 | Hanashima et al. | ............... | 277/602 |
| 7,364,167 B2 * | 4/2008 | Hedrich | ............... | 277/641 |
| 7,458,587 B2 * | 12/2008 | Caplain et al. | ............... | 277/611 |
| 7,540,956 B1 * | 6/2009 | Kurth et al. | ............... | 210/232 |
| 7,549,845 B2 * | 6/2009 | Uwami et al. | ............... | 416/198 A |
| 7,624,993 B2 * | 12/2009 | Kikuchi et al. | ............... | 277/641 |
| 7,884,914 B2 * | 2/2011 | Chen et al. | ............... | 349/153 |
| 7,901,186 B2 * | 3/2011 | Cornett et al. | ............... | 416/198 A |
| 2004/0036233 A1 * | 2/2004 | Schleth et al. | ............... | 277/641 |

(Continued)

FOREIGN PATENT DOCUMENTS

| | | |
|---|---|---|
| CH | 699066 A1 | 1/2010 |
| DE | 19520268 A1 | 12/1996 |

OTHER PUBLICATIONS

Search Report and Written Opinion from EP Application No. 12166227.4 dated Sep. 6, 2012.

*Primary Examiner* — Vishal Patel
*Assistant Examiner* — L. Susmitha Koneru
(74) *Attorney, Agent, or Firm* — Cantor Colburn LLP

(57) ABSTRACT

A spring seal assembly includes a first plate and a second plate. One or more spring elements are located between the first plate and the second plate and compressible therebetween. The spring seal assembly is insertable into a gap between two adjacent components such that at least one of the first plate and the second plate at least partially block a flow between the two adjacent components while exerting a force on the two adjacent components to prevent vibration of the seal in the gap. A method of sealing between adjacent components includes at least partially compressing a spring seal assembly. The spring seal assembly is inserted into the gap and allowed to expand in the gap thereby at least partially blocking a flow between the two adjacent components while exerting a force on the two adjacent components to prevent vibration of the seal in the gap.

12 Claims, 3 Drawing Sheets

U.S. PATENT DOCUMENTS

| | | |
|---|---|---|
| 2005/0073114 A1* | 4/2005 | Amos et al. ............... 277/644 |
| 2005/0248100 A1* | 11/2005 | Gendraud et al. ............ 277/630 |
| 2006/0255549 A1* | 11/2006 | Amos et al. ............... 277/644 |
| 2008/0106046 A1* | 5/2008 | Datta et al. ............... 277/644 |
| 2008/0213096 A1 | 9/2008 | Johnson Campino et al. |
| 2009/0033041 A1* | 2/2009 | Jung ............... 277/644 |
| 2009/0053055 A1* | 2/2009 | Cornett et al. ............. 415/208.2 |
| 2011/0150635 A1 | 6/2011 | Motzkus et al. |

\* cited by examiner

SPRING SEAL ASSEMBLY AND METHOD OF SEALING A GAP

BACKGROUND OF THE INVENTION

The subject matter disclosed herein relates to seals. More particularly, the subject disclosure relates to seals between adjacent components to improve control of leakage flow into the components.

Seals are used in a wide variety of applications, for example between hot gas path components of a turbomachine, such as between adjacent turbine nozzle segments and/or between adjacent turbine shroud segments. Seals are used to reduce or prevent leakage between the components and to regulate a level of leakage flow needed to meet thermal requirements. A reduction in leakage will improve performance of the turbomachine. One typical seal type used in turbine applications is a cloth seal. The cloth of the cloth seal is typically a woven metal that is inserted into a gap between the two components. The cloth seal, however, has limited effectiveness, as bending the seal to install it in a gap, especially a gap that is bent or curved, leaves unintended gaps along the seal path reducing the effectiveness of the seal. In such cases sealing can be compromised and vibration of the components during operation can damage the seals.

BRIEF DESCRIPTION OF THE INVENTION

According to one aspect of the invention, a spring seal assembly includes a first plate and a second plate. One or more spring elements are located between the first plate and the second plate and compressible therebetween. The spring seal assembly is insertable into a gap between two adjacent components such that the one or more of the first plate and the second plate at least partially block a flow between the two adjacent components and while exerting a force on the two adjacent components to prevent vibration of the seal in the gap.

According to another aspect of the invention, a method of sealing a gap between two adjacent components includes at least partially compressing a spring seal assembly. The spring seal assembly includes a first plate and a second plate. One or more spring elements are located between the first plate and the second plate. The spring seal assembly is inserted into the gap and allowed to expand in the gap thereby at least partially blocking a flow between the two adjacent components while exerting a force on the two adjacent components to prevent vibration of the seal in the gap.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
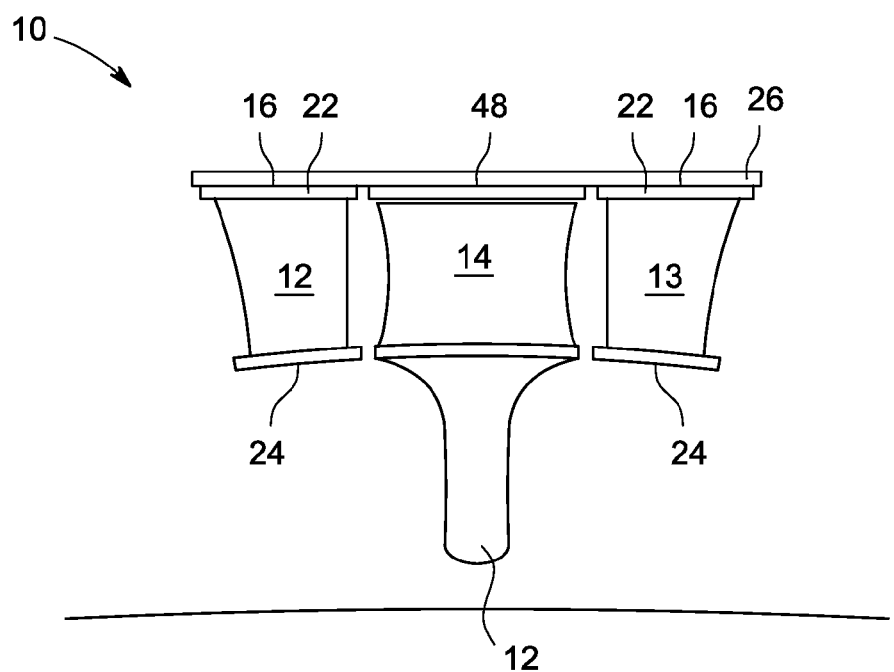
FIG. 1 is a cross-sectional view of an embodiment of a turbine.
Figure 2:
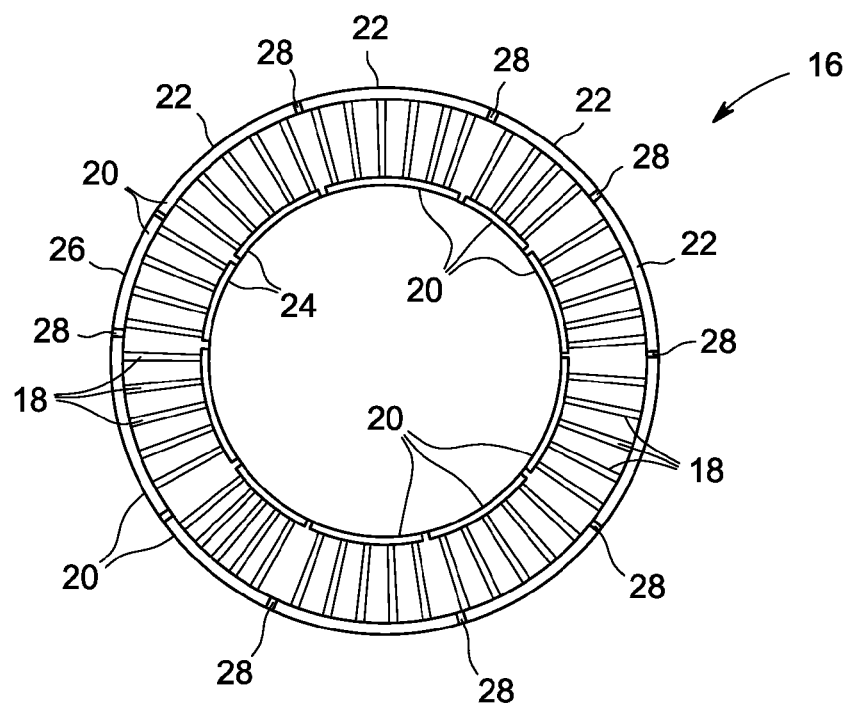
FIG. 2 is an axial cross-sectional view of a turbine.

A cross-sectional view of a turbomachine turbine 10 is shown in FIG. 1. The turbine includes at least one turbine rotor 12 including a plurality of rotor airfoils, or buckets 14. The turbine 10 further includes at least one turbine stator 16 including a plurality of stator airfoils, or nozzles 18. Referring to FIG. 2, the nozzles 18 are arranged circumferentially around the turbine 10 in a plurality of nozzle segments 20. The nozzle segments 20 each include a number of nozzles, for example, 4, 6, 8 or 12 nozzles affixed to an outer platform 22 and/or an inner platform 24. The plurality of nozzle segments 20 are installed in a turbine shell 26. A seal assembly 28 is installed between adjacent nozzle segments 20 at, for example, the outer platform 22. The seal assembly 28 provides sealing between the nozzle segments 20 and is also configured to reduce vibration of the seal assembly 28 between the nozzle segments 20 during operation of the turbine 10.

Figure 3:
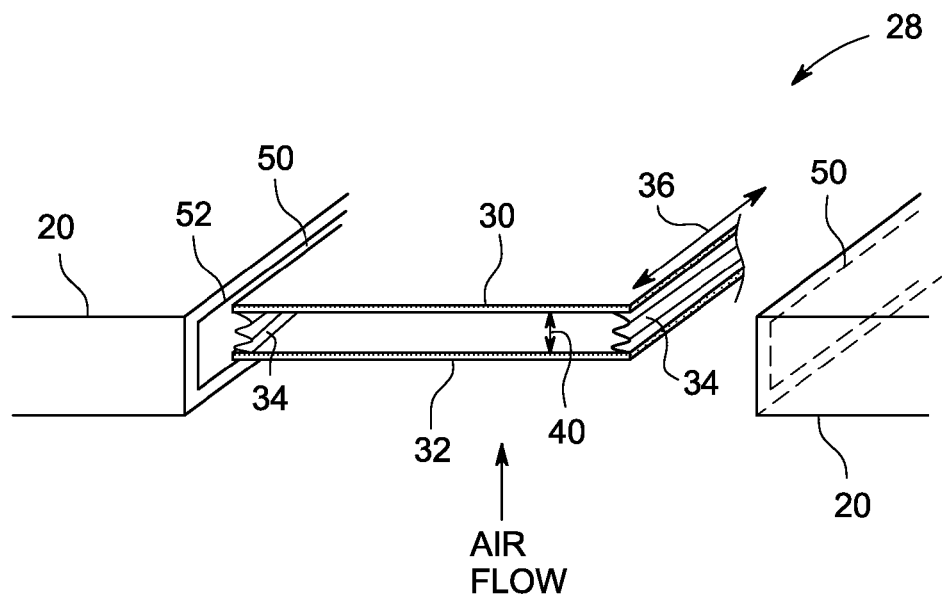
FIG. 3 is a schematic perspective view of an embodiment of a spring seal assembly.

Referring to FIG. 3, the seal assembly 28 includes a first plate 30 and a second plate 32. The plates 30, 32 may be formed of a variety of materials, for example, high temperature alloys such as stainless steel or cobalt-based alloys. Material selection depends on, for example, the thermal and corrosive properties of the environment in which the seal assembly 28 is utilized. One or more spring elements 34, formed from, for example, a spring steel such as 718 stainless steel, or cobalt-based alloy such as Haynes® 180 or L605, are placed between the first plate 30 and the second plate 32 and extend along a length 36 of the seal assembly 28. The spring elements 34 are secured to first plate 30 and/or the second plate 32 by a suitable method such as welding to prevent movement of the spring elements 34 relative to the first plate 30 and/or the second plate 32. The spring elements 34 are configured to at least partially prevent flow through the seal assembly 28. For example, the spring elements 34 may be configured to block all flow through the seal assembly 28, or may be configured with openings (not shown) to allow a metered flow through the seal assembly 28, while still reducing vibration of the seal assembly 28.

Figure 4:
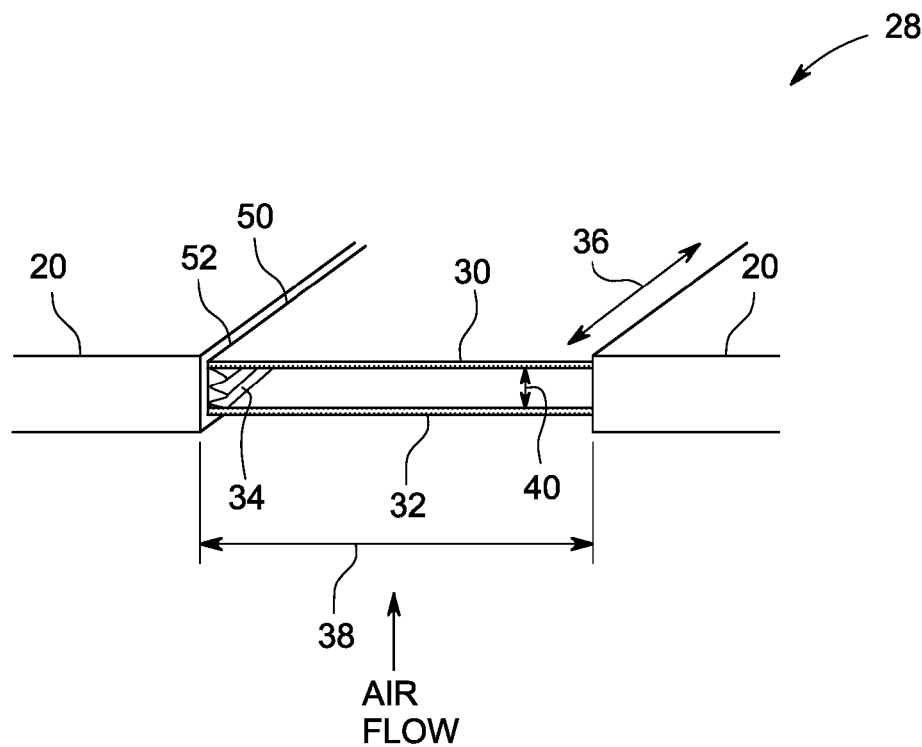
FIG. 4 is a schematic perspective view of another embodiment of a spring seal assembly.

One method of installing the seal assembly 10 into a gap 38 between the adjacent nozzle segments 20 is illustrated in FIG. 4. The gap 38 is a result of design conditions and/or a stack up in manufacturing tolerances. Before installation into the gap 38, the seal assembly 28 is compressed and the secured in the compressed state by, for example, gluing the first plate 30 to the second plate 32 with a temperature-sensitive adhesive. While in the compressed state, the seal assembly 28 is inserted into the gap 38, for example, by insertion into slots 50 formed in the nozzle segments 20, such that the first plate 30 and the second plate 32 extend across the gap 38. Once the machine in which the seal assembly 28 is installed reaches a temperature at which the glue deteriorates, for example, a turbine operating temperature, the seal assembly 28 is free to expand, the spring elements 34 exerting a force on walls 52 of the slots 50 to secure the seal assembly 28 in place. The first plate 30 and the second plate 32 block flow through the gap 38, and the force exerted by the spring elements 34 prevents vibration of the seal assembly 28.

Figure 5:
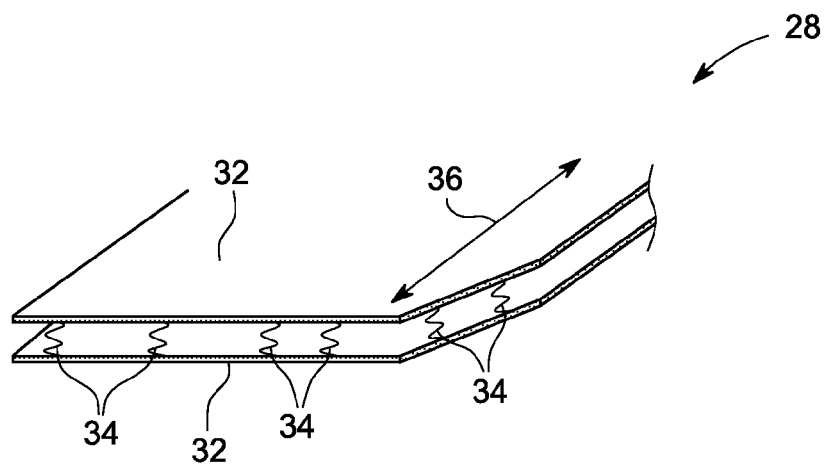
FIG. 5 is a schematic perspective view of yet another embodiment of a spring seal assembly.

Referring now to FIG. 5, some embodiments of the seal assembly 28 may be formed into a bent or curved shape prior to installation to fit into a corresponding bent or curved gap 38. The forming of the seal assembly 28 into the desired shape may take place once the seal assembly 28 is assembled, or alternatively, each component, the first plate 30, the second plate 32, and the spring elements 34, may be formed to the desired shape prior to assembly into the seal assembly 10.

Figure 6:
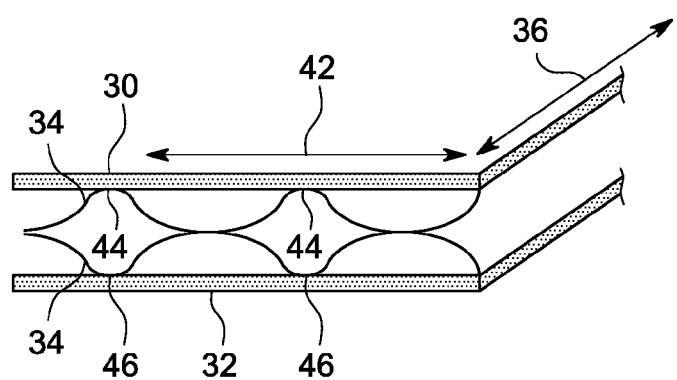
FIG. 6 is a schematic perspective view of still another embodiment of a spring seal assembly.

The spring elements 34 may take a variety of shapes. As shown in FIGS. 3, 4 and 5, the spring elements 34 are substantially wave-shaped along the thickness 40 of the seal assembly 28, while in other embodiments, as shown in FIG. 6, the spring elements 34 are wave-shaped along a width 42 of the seal assembly 28 with one or more peaks 44 and/or valleys 46 contacting the first plate 30 and/or the second plate 32.

While the seal assembly 28 to this point has been described and illustrated as being installed between adjacent nozzle segments 20, it may be utilized elsewhere in the turbomachine. For example, referring again to FIG. 1, the turbine also includes a plurality of shroud segments 48 located between the rotor buckets 14 and the turbine shell 26. The seal assembly 28 may be installed between adjacent shroud segments 48 of the plurality of shroud segments 48 to reduce leakage.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of sealing a gap between two adjacent components comprising:
    at least partially compressing a spring seal assembly, the spring seal assembly including:
    a first plate;
    a second plate; and
    one or more spring elements disposed between the first plate and the second plate;
    inserting the spring seal assembly into the gap;
    allowing the spring seal assembly to expand in the gap such that one or more of the first plate and the second plate are disposed substantially perpendicular to a flow between the two components thereby at least partially blocking the flow, while exerting a force on the two adjacent components to prevent vibration of the seal in the gap;
    compressing the spring seal assembly;
    securing the spring seal assembly in a compressed state with a thermally-sensitive adhesive;
    inserting the spring seal assembly into the gap;
    exposing the thermally-sensitive adhesive to a selected temperature which deteriorates the adhesive; and
    allowing the spring seal to expand in the gap.

2. The method of claim 1, wherein the selected temperature is an operating temperature of a combustor.

3. The method of claim 1, further comprising securing the one or more spring elements to at least one of the first plate and the second plate by welding.

4. The method of claim 1, further comprising:
    forming at least one of the first plate and the second plate into a non-planar shape; and
    inserting the seal assembly into a non-linear gap.

5. A spring seal assembly comprising:
    a first plate;
    a second plate;
    one or more spring elements disposed between the first plate and the second plate and compressible therebetween, the spring seal assembly insertable into a gap between two adjacent components such that one or more of the first plate and the second plate are disposed substantially perpendicular to a flow between two adjacent components to at least partially block the flow, while exerting a force on the two adjacent components to prevent vibration of the seal in the gap;
    the spring seal assembly is insertable into the gap by at least partially compressing the spring seal assembly; and
    the first plate is secured to the second plate with a thermally-sensitive adhesive.

6. The spring seal assembly of claim 5, wherein the one or more spring elements are secured to at least one of the first plate and the second plate.

7. The spring seal assembly of claim 5, wherein the one or more spring elements are secured to at least one of the first plate and the second plate by welding.

8. The spring seal of claim 1, wherein an uncompressed thickness of the spring seal assembly is larger than the width of the gap.

9. The spring seal assembly of claim 5, wherein the adhesive deteriorates at a desired temperature allowing for expansion of the spring seal assembly in the gap.

10. The spring seal assembly of claim 5, wherein at least one of the first plate and the second plate is substantially non-planar.

11. The spring seal assembly of claim 5, wherein the one or more spring elements have a substantially wave-shaped cross-section along a width of the spring seal assembly.

12. The spring seal assembly of claim 5, wherein the one or more spring elements are formed of spring steel.

* * * * *